United States Patent [19]

Bowden et al.

[11] Patent Number: 4,948,103

[45] Date of Patent: Aug. 14, 1990

[54] SPRING-LOADED DAMPENING ACTUATOR

[75] Inventors: Patrick J. Bowden, Peotone, Ill.; Beryle S. Doyle, Howell, Mich.

[73] Assignee: Illinois Tool Works, Inc., Chicago, Ill.

[21] Appl. No.: 303,825

[22] Filed: Jan. 30, 1989

[51] Int. Cl.⁵ .................... B60G 11/56; E05F 3/00; F16F 9/50; F16F 11/00
[52] U.S. Cl. .................... 267/34; 188/281; 188/322.22; 16/84; 267/221
[58] Field of Search ........... 188/268, 271, 281, 322.18, 188/322.22; 267/64.11, 202, 216, 226, 34, 221; 16/84, 85, 66; 92/30, 201, 202, 209

[56] References Cited

U.S. PATENT DOCUMENTS 4,629,167 12/1986 Kimura et al. .................... 267/226

FOREIGN PATENT DOCUMENTS 0002144 5/1979 European Pat. Off. ............ 188/281

Primary Examiner—Robert J. Oberleitner
Attorney, Agent, or Firm—Schwartz & Weinrieb

[57] ABSTRACT

A spring-loaded dampening actuator includes a cylindrically-shaped body member, a piston rod, a coil spring, and a one-way lip seal member. The lip seal member engages an inner sidewall of the body member only when a force is applied by means of a coil spring so as to push the piston rod out from the body member at a dampened or controlled rate of speed.

17 Claims, 2 Drawing Sheets

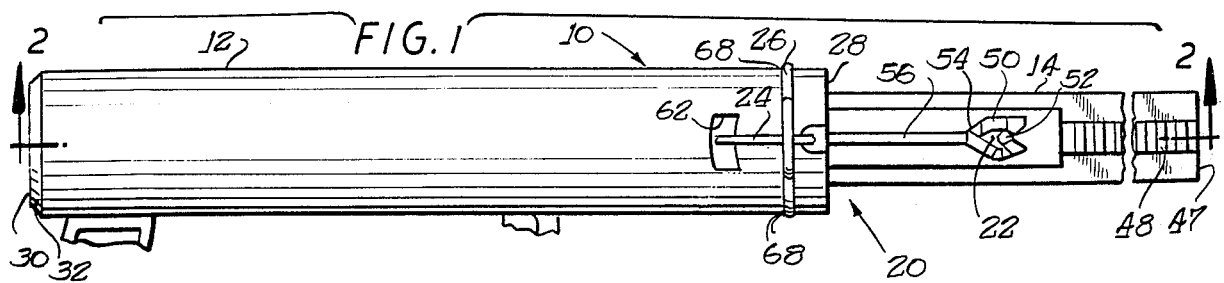
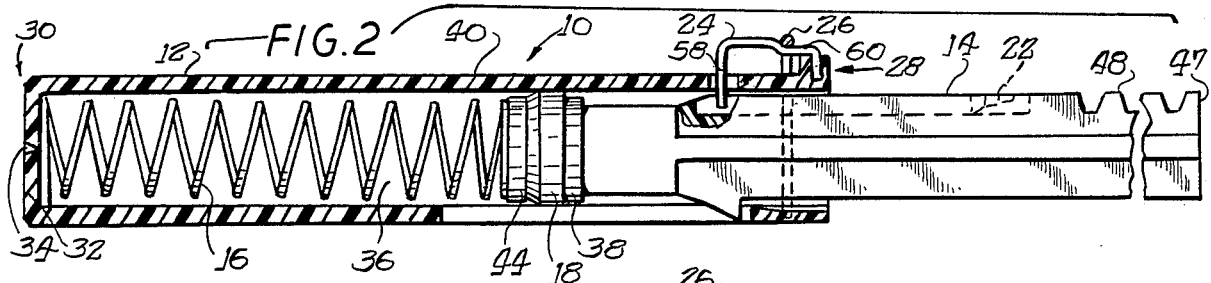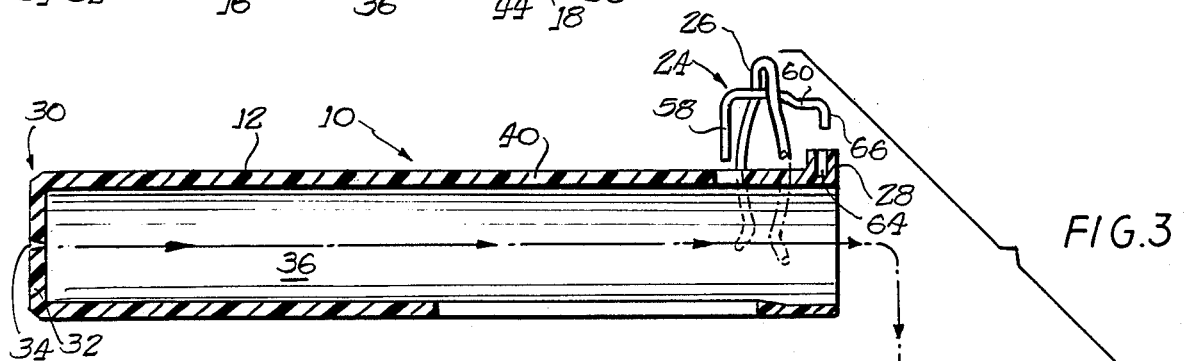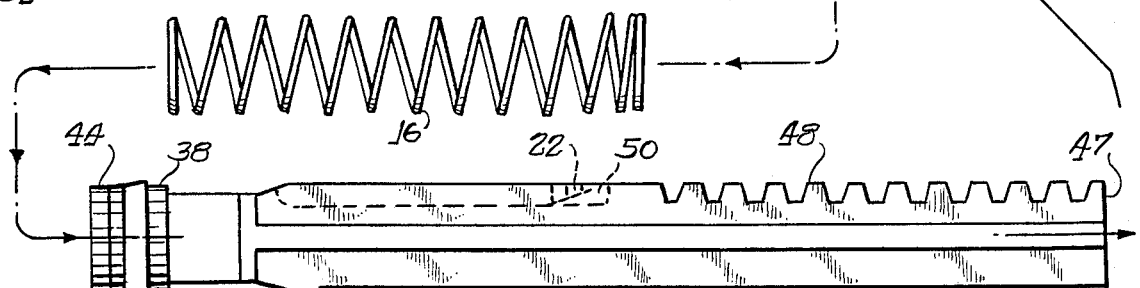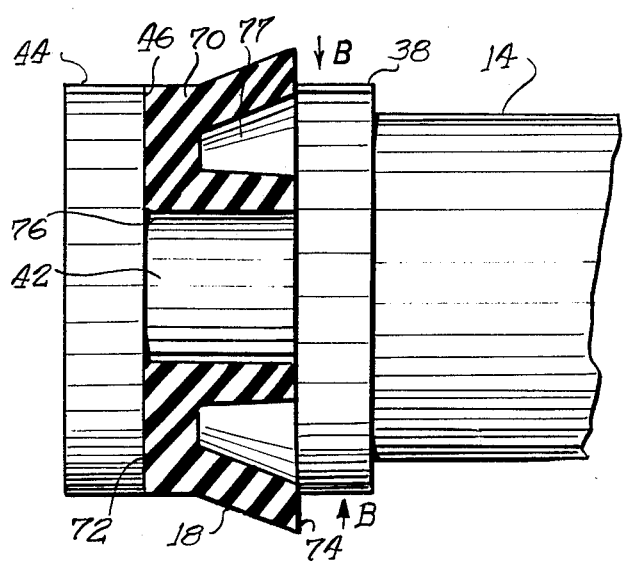

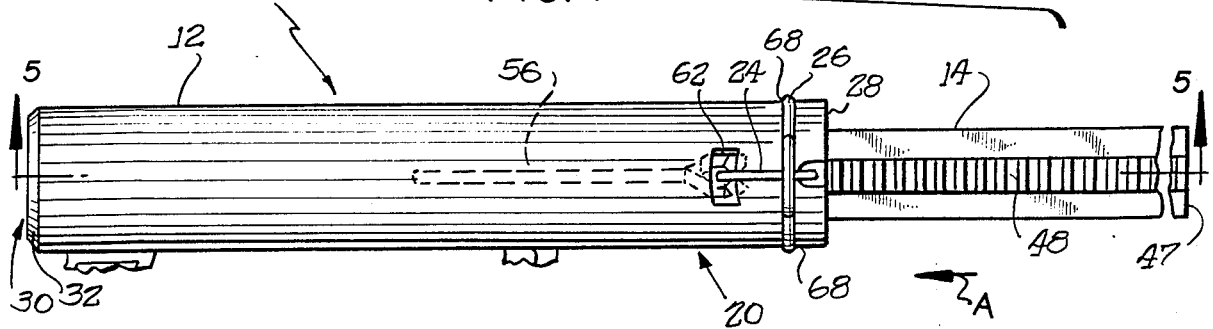
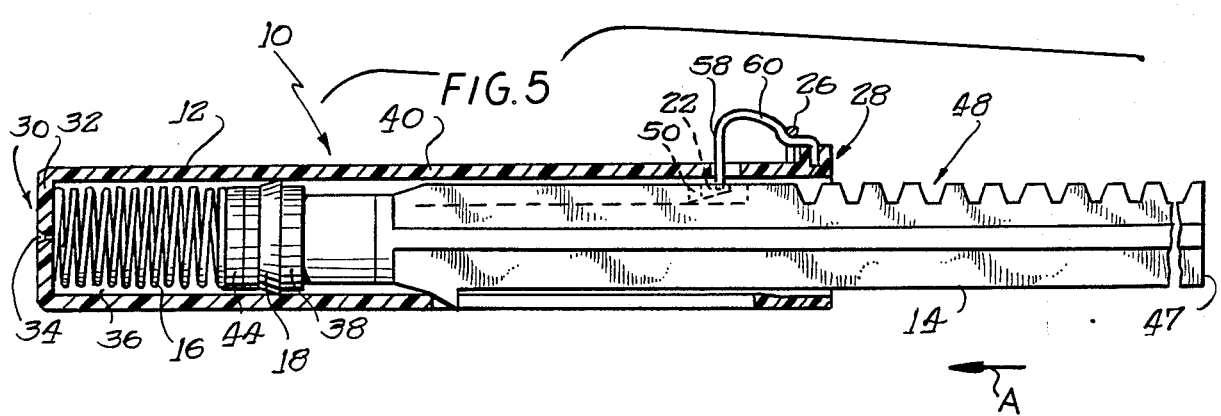

SPRING-LOADED DAMPENING ACTUATOR

BACKGROUND OF THE INVENTION

1. Field of the Invention:

This invention relates generally to damper devices and more particularly, it relates to a spring-loaded dampening actuator comprising a piston-cylinder combination in which the actuator causes an object desired to be moved to be gently pushed out at a dampened or controlled speed when activated and to be pushed in at an undampened high speed by means of a reduced force.

2. Description of the Prior Art:

Heretofore, attempts have been made in the prior art to provide damper devices for properly controlling or moderating an object such as, for example, a lid or the like in which the lid is caused to be opened from its closed position in a smooth manner and is returned to its closed position with a proper positive sensation. Such a prior art damper device is shown and described in U.S. Pat. No. 4,342,135 to Matsuo et al. wherein moderation of the lid movement is accomplished by means of damping oil functioning to slow the rotation of a roller. The roller is munted upon a rotary shaft which is disposed within a housing. In use, part of the roller 7 which is exposed outside of the housing 9 is dynamically meshed with an arcuate moving member 6 adapted to move in conjunction with the lid 3. Thus, the damping force can be applied smoothly to the lid movement in this manner.

In U.S. Pat. No. 4,542,810 to Shimbara, there is disclosed a damper device adapted to the reciprocation of sliders along rails so that, when the sliders move in one direction, the damper absorbs the motion of the sliders and causes the sliders to move at a reduced rate of speed. When the sliders move in the other direction, the damper in inactivated in order for the sliders to move at a higher rate of speed with a minimal force. In particular, the dampers 13 are each provided with a case 13a for containing oil or grease and having the damping means and an arm 13b extending rearwardly from the case toward the rear of the housing 2. The arm 13b is supported by means of holder 15. From the lateral side of the case 13a, there extends a shaft having a rotary toothed gear wheel 14 fixed thereon. The shaft is connected to means within the damper 13 adapted to have the rotation thereof braked by means of the oil or grease contained within the case 13a. In operation, during rearward movement of the sliders 10 the toothed wheels 14 do not constantly engage the rack gears 12 formed within the lateral partitions 3 of the housing 2 so as to effect a smooth insertion with minimal force. On the other hand, when the sliders 10 are pushed outwardly during their forward motion the toothed wheels are caused to be wedged against the rack gears 12 and thus rotate against the braking force of the dampers 13. Consequently, the unit case 1 is gently moved out of the housing 2 at a reduced rate of speed.

While the aforenoted prior art devices are satisfactorily operative, it is noted that all of the prior art damper devices suffer from the disadvantage that they require the use of damping oil contained within a cylinder or housing. As a result, these prior art devices are susceptible to the problem of hydraulic fluid leakage after years of use whereby such leakage can cause damage to the surrounding environment. Furthermore, these existing designs are constructed of numerous component parts which increase materials cost and time-consuming labor expenses in their manufacture and assembly. It would therefore be desirable to provide an improved dampening device which utilizes air as the dampening fluid rather than oil so as to overcome the problem of fluid leakage. It would also be expedient to provide an improved dampening device formed of a minimum number of component parts which has been traditionally unavailable, thereby reducing manufacturing and assembly costs.

The spring-loaded dampening actuator of the present invention represents an improvement over the dampening devices described above in the '135 and '810 patents.

OBJECTS OF THE INVENTION

Accordingly, it is a general object of the present invention to provide an improved dampening device comprising a piston-cylinder combination which is relatively simple and economical to manufacture and assemble, but yet overcomes the disadvantages of the prior art dampening devices.

It is another object of the present invention to provide an improved dampening device which utilizes air as the dampening fluid rather than oil so as to avoid the problem of fluid leakage.

It is yet another object of the present invention to provide an improved dampening device formed of a minimum number of component parts which has been traditionally unavailable.

It is still another object of the present invention to provide a spring-loaded dampening actuator comprising a piston-cylinder combination in which the actuator causes an object desired to be moved to be gently pushed out at a dampened or controlled rate of speed when activated and to be pushed in at an undampened higher rate of speed with a reduced force.

It is yet still another object of the present invention to provide a spring-loaded dampening actuator which includes a one-way sealing member for creating a seal between a piston rod and a cylinder only when a force is applied by means of a compressed coil spring so as to move the piston rod from a first position to a second position at a controlled rate of speed.

SUMMARY OF THE INVENTION

In accordance with these aims and objectives, the present invention is concerned with the provision of a spring-loaded dampening actuator for controlling the opening and closing of an object desired to be moved which includes a cylindrically-shaped body member, a piston rod, a coil spring, and a one-way lip seal member. The body member is formed with a chamber, an open front end, and an endwall having a vent hole. The piston rod is disposed within the body member through the open front end and is provided with a front end and a rear end. The piston rod has a circular plate formed integrally adjacent its front end, a cylindrically-shaped connecting member extending longitudinally from the circular plate, and a disc formed integrally with the connecting member and being disposed parallel to the plate in an axially spaced apart relationship. The lip seal member is disposed around the connecting member and is sandwiched between the plate and the disc. The compressed coil spring is disposed within the chamber and extends between the endwall and the disc.

The lip seal member engages an inner sidewall of the body member only when a force is applied by means of the coil spring so as to push the piston rod out from the body member at a controlled rate of speed. The seal member is disengaged from the inner sidewall of the body member when the piston rod is being pushed into the body member so that air trapped within the chamber is allowed to escape through the vent hole and between the inner sidewall and the lip seal member, thereby facilitating a quick closing of the actuator at an undampened higher rate of speed.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views, and wherein:

FIG. 1 is a top plan view of a spring-loaded dampening actuator constructed in accordance with the principles of the present invention, illustrated in the unlocked or opened position;

FIG. 2 is a cross-sectional view of the dampening actuator, taken along the lines 2—2 of FIG. 1;

FIG. 3 is an exploded view of the dampening actuator;

FIG. 4 is a top plan view of the dampening actuator, illustrated in the locked or closed position; FIG. 5 is a cross-sectional view of the dampening actuator, taken along the lines 5—5 of FIG. 4; and FIG. 6 is an enlarged, fragmentary view of the lip seal member and piston rod of the dampening actuator.

DESCRIPTION OF THE PREFERRED EMBODIMENT

Referring now in detail to the various views of the drawings and in particular to FIGS. 1-3, there is shown a spring-loaded dampening actuator 10, constructed in accordance with the principles of the present invention for causing an object (not shown) desired to be moved to be gently or smoothly pushed out (opened) at a dampened or controlled rate of speed when activated and to be pushed in (closed) at an undampened or higher rate of speed with a reduced force. In other words, the dampening actuator may be utilized for controlling the opening and closing of the object desired to be moved, such as, for example, a door, lid, and the like. The spring-loaded dampening actuator 10 is comprised of a cylindrically-shaped body member 12, a piston rod 14, a coil spring 16, and a one-way lip seal member 18. The dampening actuator also includes a "push-push" type of locking device 20 formed by means of a heart-shaped cam part 22, a follower pin 24, and a retaining clip 26.

The cylindrically-shaped body member 12 is open at its one or front end 28 and is substantially closed at its other or rear end 30 by means of an endwall 32. The endwall 32 is provided with a central vent hole 34 which allows air to escape from the chamber 36 formed within the body member 12, as will be presently explained. The piston rod 14 is provided at its one or front end with a circular plate 38 formed integrally therewith and which is disposed perpendicularly to the axis of the piston rod 14.

The circular plate 38 has a diameter which is smaller than the diameter of the inner sidewall 40 of the body member 12. Extending longitudinally from the plate 38 is a cylindrically-shaped connecting member 42 which terminates with a disc 44 disposed parallel to the plate in an axially spaced apart relationship (FIG. 6). The disc 44 has a diameter which is substantially equal to the diameter of the plate 38. The connecting member 42 is formed with a diameter which is smaller than the diameters of the plate and disc. As a result, an annular recess 46 is formed between the plate and the disc for receiving the seal member 18, as will be explained more fully hereinafter.

The coil spring 16 is disposed between the endwall 32 of the body member 12 and the disc 44 of the piston rod 14. One end of the coil spring 16 is held by means of the inner surface of the endwall 32. and the other end of the coil spring is held by means of the outer surface of the disc 44. Adjacent to the other or rear end 47 of the piston rod 14, there is formed a rack-type gear 48 upon its outer surface which is suitably adapted to mate with a pinion gear (not shown) so as to produce a rotational movement of the object desired to be moved.

The heart-shaped cam part 22 of the locking device 20 is formed adjacent the inner end of the rack-type gear 48. A cam recess 50 is disposed around the cam part 22 which has a V-shaped portion 52 arranged at its right end (FIG. 1) and a tip surface 54 positioned at its left end. The tip surface 54 is formed adjacent a longitudinally-extending slot 56 defined within the outer surface of the piston rod 14. The follower pin 24 has an L-shaped configuration formed from a first leg portion 58 and a second leg portion 60.

The first leg portion 58 is inserted into the slot 56 by means of a rectangularly-shaped cut-out 62 formed within the sidewall 40 of the body member 12 adjacent the front end of the body member 12. The cylindrically-shaped body member 12 further includes a small aperture 64 defined within the vicinity of the open end of the sidewall 40 for receiving a projection 66 formed integrally with the second leg portion 60 of the pin 24. The retaining clip 26 of a C-shaped design is adapted to be placed within arcuate grooves 68 disposed upon the outer surface of the sidewall 40 of the body member. As a result, the first leg portion 58 of the follower pin 24 is retained relatively movable within the slot 56 due to the engagement of the retaining clip 26 against the second leg portion 60.

With reference to FIG. 6, the one-way lip seal member 18 has a generally tapered configuration and is preferably formed of an elastically deformable material such as, for example, rubber, foam, or the like. The lip seal member 18 includes a bell-shaped body portion 70 which extends between a narrow front end 72 and a flared rear end 74. As can be seen, the lip seal member 18 is hollow in the axially central portion thereof and has an inner surface formed by means of a central opening 76. The diameter of the opening 76 is slightly larger than the diameter of the cylindrically-shaped connecting member 42. The lip seal member 18 is disposed in surrounding relationship with the connecting member 42 and is sandwiched between the plate 38 and the disc 44. The body portion 70 is formed internally with a U-shaped annular groove so as to permit a limited amount of deformability.

The operation of the spring-loaded dampening actuator 10 of the present invention is best understood by reference initially to FIG. 4 and 5. In the closed position, it will be noted that the piston rod 14 is held or locked in place interiorly of the body member 12 until motion is required. This is due to the fact that the first leg portion 58 of the follower pin 24 is retained or locked within the V-shaped portion 52 of the cam part 22. Furthermore, the coil spring 16 has been compressed within the chamber 36 of the body member 12.

In order to activate the dampening actuator 10, the rear end 47 of the piston rod 14 is pushed slightly to the left in the direction of arrow A and then released so that the piston rod moved further into the body member 12. As a result, the first leg portion 58 of the follower pin 24 is caused to move in a counter-clockwise direction around the cam recess 50, thereby releasing or unlocking the piston rod. This permits the coil spring 16 to push the piston rod out from the body member so as to produce a linear motion. As the piston rod 14 is being pushed out, the first leg portion 58 will travel along the slot 56. In this manner, the piston rod will be caused to move from the closed position shown in FIGS. 4 and 5 to the open position illustrated in FIGS. 1 and 2.

In addition, when the piston rod is moved to the right by means of the biasing force of the coil spring 16, the flared end 74 of the lip seal member 18 frictionally engages the inner sidewall 40 of the body member and is deformed under pressure so as to cause the flared end to spread or expand radially outwardly against the inner sidewall 40 of the body member, thereby creating a seal. As a result, the piston rod 14 is caused to move or slide to the right at a dampened or controlled rate of speed.

In order to return the actuator to its closed position, the rear end 47 of the piston rod 14 is again pushed to the left. In this manner, the piston rod is moved into the body member and the first leg portion 58 of the pin is caused to move initially along the slot 56. As the first leg portion 58 reaches the tip surface 54 of the cam part 22, it will then be moved in the counter-clockwise direction toward the right end of the cam recess 50 where it is stopped. Next, the end 47 of the piston rod is released. As a consequence, the portion 58 will move up and into the V-shaped portion 52 of the cam part, thereby locking the piston rod within the body member as shown in FIGS. 4 and 5.

When the piston rod 14 is pushed in or moved to the left, the narrow end 72 of the lip seal member 18 permits the insertion of the piston rod 14 into the body member 12 with a reduced force since it does not engage the inner sidewall 40 thereof. Furthermore the trapped air within the chamber 36 is allowed to escape by means of the vent hole 34, thereby facilitating a quick closing of the actuator at an undampened higher rate of speed. Simultaneously, the flared end 74 is deformed under pressure in the direction of arrows B (FIG. 6) so as to be compressed radially inwardly due to the presence of U-shaped groove 77. This further allows the air to escape between the inner sidewall 40 and the seal member 18 and then out the front end 28 of the body member 12.

From the foregoing detailed description, it can thus be seen that the present invention provides an improved dampening actuator comprising a piston-cylinder combination and a lip seal member. The seal member engages an inner sidewall of the cylinder only when a force is applied by means of a coil spring so as to push the piston rod out from the cylinder at a controlled rate of speed.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A spring-loaded dampening actuator, comprising:
    a cylindrically-shaped body member comprising a chamber, an open front end, and an endwall having a vent hole;
    a piston rod disposed within said body member so as to project partially outwardly from said chamber of said body member through said open front end of said body member, said piston rod having a front end and a rear end, said piston rod having a circular plate formed integrally adjacent said front end of said piston rod, a cylindrically-shaped connecting member extending longitudinally axially from said circular plate, and a disc formed integrally with said connecting member and being disposed parallel to said plate in an axially spaced apart relationship;
    sealing means disposed around said connecting member of said piston rod and sandwiched between said circular plate and said disc;
    a compressed coil spring disposed within said chamber of said body member and extending between said endwall of said body member and said disc of said piston rod so as to tend to bias said piston rod outwardly of said chamber of said body member;
    said sealing means having an outer peripheral portion thereof engaging an inner peripheral sidewall portion of said body member only when a biasing force is applied to said piston rod by said coil spring so as to move said piston rod in a first direction out of said chamber of said body member at a controlled a rate of speed; and
    said sealing means being provided with an annular groove, defined between said outer peripheral portion thereof and an inner peripheral portion thereof which surrounds said connecting member of said piston rod, which imparts a predetermined amount of radial flexibility to said sealing means so as to permit said outer peripheral portion thereof to be disengaged from said inner peripheral sidewall portion of said body member, when said piston rod is moved in a second direction, opposite to said first direction, into said chamber of said body member, as a result of radially inward compression of said outer peripheral portion of said sealing means so that air trapped within said chamber of said body member is allowed to escape through said vent hole and only between said outer peripheral portion of said sealing means and said inner peripheral sidewall portion of said body member at the axial location defined within said chamber of said body member within the vicinity of said sealing means of said piston rod, thereby facilitating a quick contraction of said actuator at an undampened higher rate of speed.

2. A dampening actuator as claimed in claim 1, wherein said sealing means comprises a lip seal member formed of a bell-shaped body portion which extends between a narrow front end and a flared rear end, said lip seal member having an inner surface formed by a central opening and being disposed in surrounding relationship with said connecting member.

3. A dampening actuator as claimed in claim 1, wherein said lip seal member is formed of an elastic material.

4. A dampening actuator as claimed in claim 3, wherein said elastic material comprises rubber.

5. A dampening actuator as claimed in claim 3, wherein said elastic material comprises foam.

6. A dampening actuator as claimed in claim 1, further comprising locking means for retaining said piston rod within said body member in a closed position until motion is required.

7. A dampening actuator as claimed in claim 6, wherein said locking means comprises a cam part and a follower pin, said pin being retained in a V-shaped portion of said cam part in the closed position and being released therefrom when the rear end of said piston rod is moved slightly into said body member.

8. A dampening actuator as claimed in claim 7, further comprising a retaining clip for holding said follower pin in place.

9. A spring-loaded dampening actuator, comprising:
a cylindrically-shaped body member comprising a chamber, an open front end, and an endwall having a vent hole;
a piston rod disposed within said body member so as to project partially outwardly from said chamber of said body member through said open front end of said body member, said piston rod having a front end and a rear end;
a one-way sealing member disposed adjacent said front end of said piston rod;
a compressed coil spring disposed within said chamber of said body member and extending between said endwall of said body member and said front end of said piston rod so as to tend to bias said piston rod outwardly of said chamber of said body member;
said sealing member having an outer peripheral portion thereof engaging an inner peripheral sidewall portion of said body member only when a biasing force is applied to said piston rod by said coil spring so as to move said piston rod in a first direction out of said chamber of said body member at a controlled rate of speed; and
said sealing member being provided with an annular groove, defined between said outer peripheral portion thereof and an inner peripheral portion thereof which surrounds said piston rod, which imparts a predetermined amount of radial flexibility to said sealing member so as to permit said outer peripheral portion thereof to be disengaged from said inner peripheral sidewall portion of said body member, when said piston rod is moved in a second direction, opposite to said first direction, into said chamber of said body member, as a result of radially inward compression of said outer peripheral portion of said sealing member so that air trapped within said chamber of said body member is allowed to escape through said vent hold and only between said outer peripheral portion of said sealing member and said inner peripheral sidewall portion of said body member at the axial location defined within said chamber of said body member within the vicinity of said sealing member of said piston rod, thereby facilitating a quick contraction of said actuator at an undampened high rate of speed.

10. A dampening actuator as claimed in claim 9, wherein said sealing member comprises a lip seal member formed of a bell-shaped body portion which extends between a narrow front end and a flared rear end, said lip seal member having an inner surface formed by a central opening and being disposed in surrounding relationship with said piston rod.

11. A dampening actuator as claimed in claim 9, further comprising locking means for retaining said piston rod within said body member in a closed position until motion is required.

12. A dampening actuator as claimed in claim 11, wherein said locking means comprises a cam part and a follower pin, said pin being retained in a V-shaped portion of said cam part in the closed position and being released therefrom when the rear end of said piston rod is moved slightly into said body member.

13. A dampening actuator as claimed in claim 12, further comprising a retaining clip for holding said follower pin in place.

14. A spring-loaded dampening actuator, comprising:
a cylinder having a chamber, an open front end, and a rear wall formed with a vent hole;
a piston rod having a front end and a rear end, said piston rod being disposed so as to reciprocate within said cylinder between a first position and a second position;
a compressed coil spring disposed within said chamber of said cylinder and extending between said rear wall of said cylinder and said front end of said piston rod so as to tend to bias said piston rod outwardly of said chamber of said cylinder; and
one-way sealing means having an outer peripheral portion thereof engaging an inner peripheral portion of said cylinder for creating a seal between said piston rod and said cylinder only when a biasing force is applied by said coil spring to said piston rod so as to move said piston rod from said first position to said second position at a controlled rate of speed, and having an annular groove, defined between said outer peripheral portion thereof and an inner peripheral portion thereof which surrounds said piston rod, which imparts a predetermined amount of radial flexibility to said sealing means so as to permit said outer peripheral portion thereof to be disengaged from said inner peripheral portion of said cylinder and thereby break said seal defined between said piston rod and said cylinder, when said piston rod is moved into said cylinder from said second position to said first position, as a result of radially inward compression of said outer peripheral portion of said sealing means so that air trapped within said chamber is allowed to escape through said vent hole and only between said outer peripheral portion of said sealing means and said inner peripheral portion of said cylinder at the axial location defined within said chamber of said cylinder within the vicinity of said sealing means of said piston rod, thereby facilitating a quick insertion of said piston rod into said cylinder at an undampened higher rate of speed.

15. A dampening actuator as claimed in claim 14, wherein said sealing means comprises a lip seal member formed of a bell-shaped body portion which extends between a narrow front end and a flared rear end, said lip seal member having an inner surface formed by a central opening and being disposed in surrounding relationship with said piston rod.

16. A dampening actuator as claimed in claim 14, further comprising locking means for retaining said piston rod within said cylinder in a closed position until motion is required.

17. A dampening actuator as claimed in claim 16, wherein said locking means comprises a cam part and a follower pin, said pin being retained in a V-shaped portion of said cam part in the closed position and being released therefrom when the rear end of said piston rod is moved slightly into said cylinder.

* * * * *